March 28, 1967 C. A. BURTON ETAL 3,311,736
RESISTANCE SOLDERING APPARATUS
Filed April 9, 1964 2 Sheets-Sheet 1

WITNESSES:
John G. Chopp
James F. Young

INVENTORS
Jack W. Clements and
Charles A. Burton
BY
D. S. Streitiff

March 28, 1967   C. A. BURTON ET AL   3,311,736
RESISTANCE SOLDERING APPARATUS
Filed April 9, 1964   2 Sheets-Sheet 2
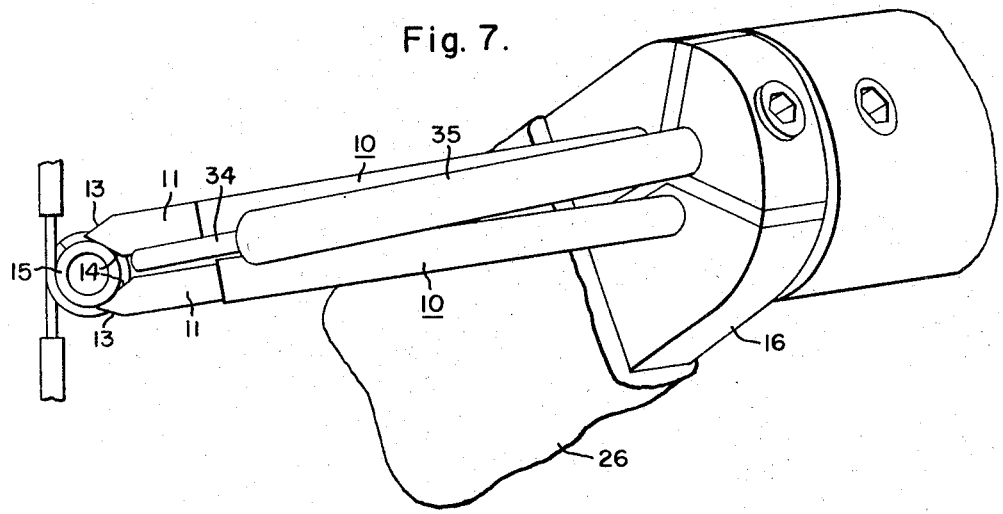
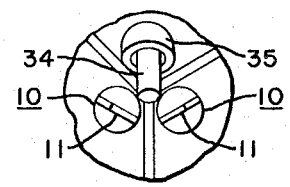
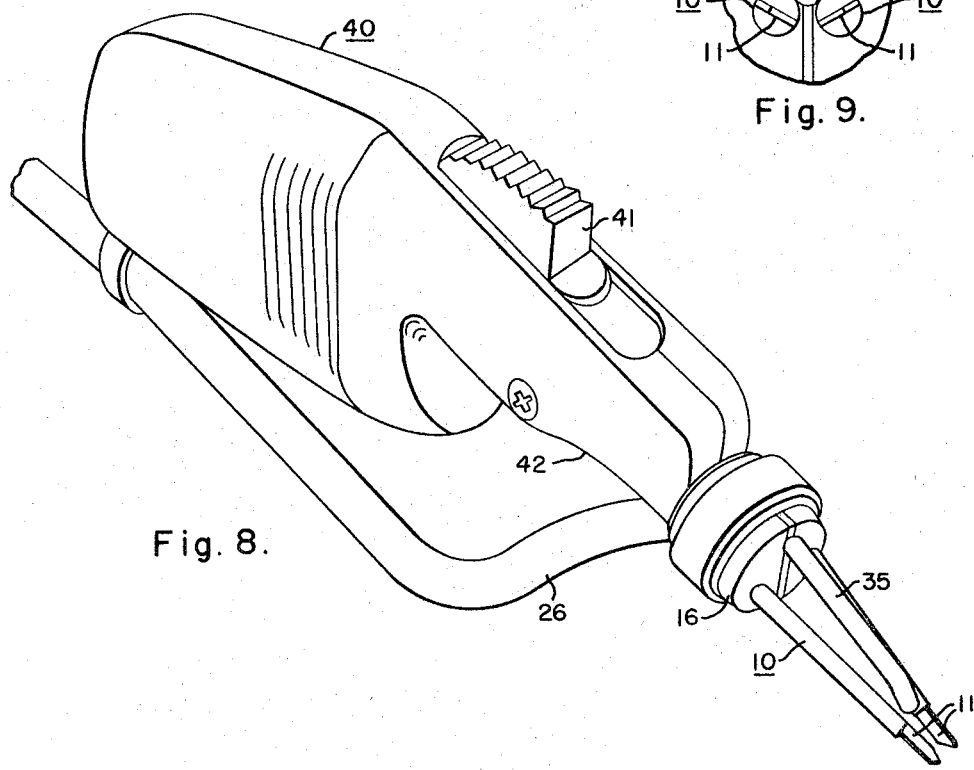

3,311,736
RESISTANCE SOLDERING APPARATUS

Charles A. Burton, Pitcairn, and Jack W. Clements, Monroeville, Pa., assignors to Westinghouse Electric Corporation, Pittsburgh, Pa., a corporation of Pennsylvania
Filed Apr. 9, 1964, Ser. No. 358,439
10 Claims. (Cl. 219—234)

This invention relates to resistance soldering apparatus, and more particularly to improved electrode means for contact with a workpiece.

Resistance soldering apparatuses have been proposed heretofore and are available commercially which employ electrode means for contact with a workpiece whereby current flows via such workpiece and it becomes heated to cause solder to melt and flow thereto. The desirability of employing such apparatus is determined primarily by the characteristics of the electrode means which contacts the workpiece. Prior electrode means can be judged to possess a number of undesirable characteristics, severally or collectively, according to one construction or another. For example, some are fragile, become easily broken and require frequent replacement or extreme care in handling, some generally become hot in each instance of use sufficient to produce operator burns or melting of electrical insulation, some are relatively inefficient and demand increased power consumption and/or prolonged heating time, some are difficult to use, some become oxidized to an extent that frequent surface cleaning and/or replacement is necessary to assure their making contact with the workpiece, and some are easily bent or distorted.

In view of the foregoing remarks, it becomes an object of the present invention to provide an improved electrode means for resistance soldering.

Another object of the present invention is the provision of improved resistance soldering electrode means which is free of each and all of the aforementioned objections.

Briefly, the present invention accomplishes the above-cited objects by provision of an electrode means having an improved tip of relatively high-conductivity material in the form of a thin-blade configuration which may be brought into edgewise electrical contact with the workpiece. The thin blade configuration enables electrical contact with the workpiece to be established readily by virtue of its ability to penetrate surface oxides and films. The thin edge in contact with the workpiece establishes a small area of contact which assures a high current density and high heating effect at this location. The thin-blade tip configuration has edgewise strength capability while presenting a minimal amount of heat-robbing electrode mass in affiliation with the thin edges where the principal heating occurs.

Other objects, advantages, and features of the invention will become apparent from the following detailed description when taken in connection with the accompanying drawings, in which:

FIG. 7 is a three-dimensional view of the FIG. 6 assemblage in affiliation with a solder guiding means; and FIG. 8 illustrates an affiliation of the electrode means in a hand tool assemblage; and FIG. 9 is a fragmentary view of the assemblage of FIG. 7 as viewed from the ends of the electrode tips.

Figure 1:
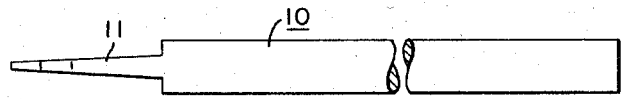
FIGS. 1 to 3 are top, side, and end views, respectively, of an illustrative embodiment of the invention.
Figure 2:
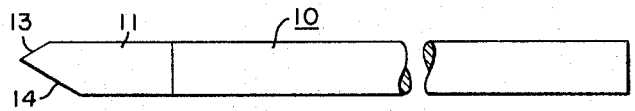

Referring to the drawings, an exemplification of a novel electrode 10 which has been constructed and operated with success is shown. Such electrode 10 is in the general form of a rod and constructed of tungsten, which has a low specific resistace, as compared to carbon, for example, is not wettable by solder, and is bend and wear resistant. A commercially-available tungsten material in the form of a welding electrode; 2% thoriated tungsten rod was employed. For soldering such as 19 gauge wires to ⅛ inch diameter posts of brass, for example, an electrode 10 diameter of 3/32 or .094 inch was employed. This size affords a high degree of strength and rigidity while affording a low resistance path for flow of current to its tip, so that internal heating of the electrode rod is minimized at the usual soldering duty rates and heat requirements which may entail, for example, periodic current flow of up to 60 amperes for one second. Such low resistance path afforded by the electrode rods is a factor which affords use of a relatively low voltage source such as ¾ volt to 2 volts, which can be furnished by transformer or battery, and contributes to highly efficient use of heating current. For smaller soldering tasks, tungsten electrodes 10 of less than 3/32 inch are feasible. On the other hand, larger diameter electrode rods may be desired for soldering to large masses of metal requiring greater than the usual circuit wiring heating current demand.

In accord with the prime features of the invention irrespective of the material of which the electrode is composed, the tip portion 11 of the electrode, i.e., the workpiece contacting portion, takes the form of a thin blade configuration which presents edges of narrow cross-section for oxide-penetrable limited-area contact with the workpieces to be heated for soldering. It affords a high degree of rigidity in the direction of its edges, and, commensurate with such rigidity, has minimal heat-robbing mass adjacent to such edges. In the illustrative examples shown herein, such workpiece contacting portion 11 of the rod-shaped electrode 10 is formed integrally therewith. This is advantageous in that such thin-blade configuration of such portion may be arrived at by grinding both sides of the end of a suitable length of rod, 3/32 inch diameter tungsten rod 2¼ inches long, for example. The length of the illustrative tip portion was made 9/32 inch long, a length of three rod diameters. As shown with particular clarity in FIGS. 1–3, the degree of "thinness" for this particular embodiment was .010 at its extreme tip to .040 at its intersection with the rod proper, the taper being desirable for added strength in preventing tip breakage with rough handling. The width of the tip is equal to the diameter of the rod portion except for the projecting end of such tip which is the thinner portion with a tapered shape for contact with the workpiece and has an average thickness of about .015 inch. In FIGS. 1–3, 6 and 7, the end of the tip has external-angled edges 13 and 14 (FIG. 2) of such as 30° with the rod axis, which when arranged side-by-side with a similar tip end as in FIGS. 6 and 7, affords a V-shape which is well suited for straddling contact with such as a soldering post 15 as in FIG. 6. The intersection of the two edges 13 and 14 is offcenter with respect to the rod axis, so that by turning the rods 10 about their respective axes one or the other edges 13, 14 of one tip 11 can be made to face an edge 13, 14 of an adjacent tip to vary the size and shape of the V presented by the side-by-side tips 11 when mounted in an electrode holder 16, as in FIGS. 6 and 7. By mounting each electrode 10 in elongated bores 17, 18 in respective mutually-insulated portions 19, 20 of holder 16 and securing same in place adjustably, as by set screws 21 and 22, and arranging such bores along convergent axes, the degree of separation of the electrode tips 11 can be adjusted according to the insertion position of the electrodes 10; the tips being brought closer together as the electrode projection beyond the holder 16 is increased.

It is desirable to make the electrode blade tip 11 as thin as possible without undue sacrifice in strength. The tapered configuration given the tips of the illustrated embodiment in behalf of giving added break-resistance to the relatively brittle tungsten material without undue compromise to minimal thickness.

Figure 4:
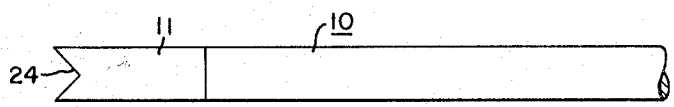
FIGS. 4 and 5 are three-dimensional views of several other electrode configurations, respectively, embodying the invention.
Figure 5:
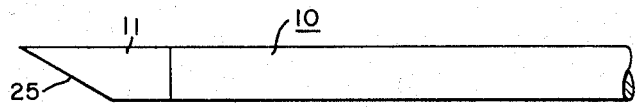
Figure 3:

Other blade shapes are also suitable and can take a shape suited for a particular workpiece, such as a concave or V-angle notch shape 24 of FIG. 4, or the edge-pointed shape 25 of FIG. 5.

Figure 6:
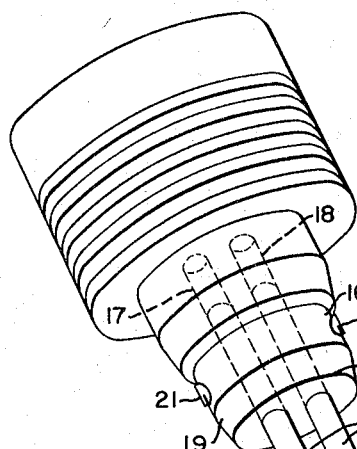
FIG. 6 is a three-dimensional view of a novel illustrative dual electrode assemblage embodying the invention.
Figure 6:
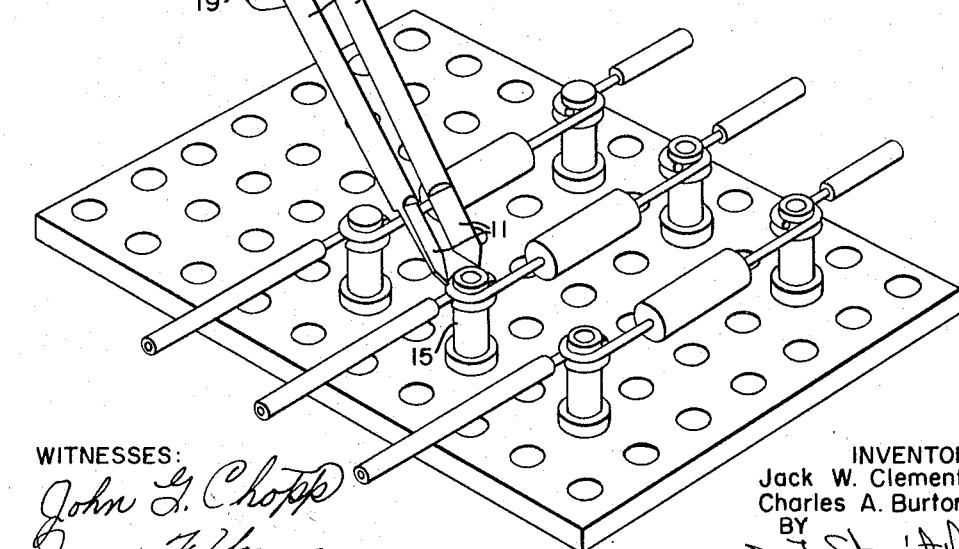

In use of the electrodes of the illustrative embodiment described herein, opposite poles of a source of current, which may be direct or alternating, at as little as ¾ volt is availed the electrodes 10 by way of a pair of high current leads, such as represented at 26 in FIG. 7 but not shown in FIG. 6. When the narrow front tip edges 13 or 14, at about .010 to .015 inch, are brought into engagement with a workpiece to be heated for soldering, such as post 15 in FIG. 6, by virtue of the thin edges of the tips 11, any hardened flux accumulation thereon or surface oxide on the workpiece is readily penetrated and an electrical contact between the tips 11 and workpiece 15 quickly established to cause a current to flow via the electrodes 10 and between their tips via the workpiece. The workpiece 15 to be heated for soldering, including leads and wires wrapped therearound are usually of material such as copper or brass having high electrical conductivity which has only a relatively slight tendency to be heated internally by flow of current therethrough. At the points of contact between the thin edges of the electrode tips 11 and the workpiece, however, the current density and contact resistance is extremely high and heating occurs at a rapid rate. This heat is absorbed by the workpiece to raise it rapidly to a temperature at which solder will melt, while the thin low-mass configuration of such electrode tips 11 acts as a thermal barrier which minimizes the amount of heat which the electrodes absorb from the rapidly heated edge contact area. At the same time, very little internal heating of the electrodes 10 occurs, due to their size and material, so that solder-melting-temperature heating by use of the novel electrodes of the present invention enables such efficiency to be realized as renders it practical, if desired, to perform a full day of production soldering from a storage battery of 34 ampere hours or smaller, a size which can be relatively small and light weight.

In addition to the foregoing description, it should also be pointed out that by the thin-blade configuration of the tip 11, when oriented side-by-side as in FIGS. 6 and 7 in a V-formation as viewed from the ends of such tips, FIG. 9, a trough or channel is formed which, when tilted downwardly, is capable of conveying molten solder to the workpiece. The solder by receiving heat from the workpiece or by receiving current by bridging the narrow gap between the tips 11, in becoming molten will travel downwardly to the workpiece between the tip ends. At the same time, the V-formation between two adjacent tip ends can serve to facilitate introduction of solder to the workpiece 15 by advancing solder wire 34 between the tips 11 via the troughway therebetween. This enables a solder feeding means, such as a solder feed tube 35, to be affiliated with the electrodes 10 and their holder 16, as shown in FIGS. 7 and 8. The electrode holder 16 may be affiliated with a hand grip assemblage which may include a solder feeding mechanism, such as the model S–001 KORMAT solder dispenser tool manufactured by the Commercial Products Division of International Electronic Research Corporation of Burbank, Calif., and which includes a hand grip housing 40 in which is contained a spool of solder wire (not shown) from which solder wire is advanced by thumb actuation of a knurled slider member 41 toward a necked-down forward end 42 of the tool, on which end the electrode holder 16 with solder feed tube 35 is mounted, the tube 35 being arranged to receive the solder wire being advanced by member 41 actuation and to direct such solder wire between the tips 11 of the electrodes 10 projecting from holder 16. U.S. Patent 3,070,057 discloses and describes a solder feeding mechanism of the type employed in the KORMAT solder dispenser tool. Reference may be had to such patent for an understanding of operation of the solder feed mechanism, but since such mechanism per se, forms no part of the present invention, no further details are deemed necessary herein.

Summary

In accord with generalized aspects and features of the illustrative thin-blade-tip of the novel electrode means shown and described in detail hereinbefore, the electrode tip of the present invention has all of the following general characteristics: It is made of a material of relatively low specific electrical resistivity, as compared to carbon, for example, and at least no greater than twenty times that of copper, so that it will convey electrical energy to the workpiece with minimal resistance heating within the tip; it has edge surfaces for contact with the workpiece which are thin, no greater than thirty-thousandths of an inch thick, to facilitate penetration of surface oxides and films to establish electrical contact with a workpiece readily while providing a sufficient but limited area of such contact for realization of a high current density at the contact point; for a substantial portion of its length, it has a width dimension extending transversely of such edge surfaces and of such length which is in excess of the thickness of such edges by a factor of two or more to rigidize such tip in the direction of its contact edges in behalf of preventing damage thereof as a result of forceful engagement between such edges and the workpiece; and it has a low thermal acceptability for heat generated at its contact edges, which can be expressed in terms of having a small average cross sectional area for a given tip length via which heat must flow from the contact edges to reach a relatively great heat acceptable mass, such as the rod-shaped part of the electrode, and can be represented as a thermal figure of merit, $A_{\text{ave.}}/L$, which, in measuring in inches, should be less than .05 inch, and is about .01 inch in the illustrative embodiment described in FIGS. 1 to 3.

Other general aspects of the invention relate to workpiece contactor edge surfaces on electrode tips for nesting contact with a workpiece, and to an improved electrode tip which is relatively easy to fabricate.

While there have been shown and described what are at present considered to be preferred embodiments of the invention, modifications thereto will readily occur to those skilled in the art. It is not desired, therefore, that the invention be limited to the specific arrangements shown and described and it is intended to cover in the appended claims all such modifications as fall within the true spirit and scope of the invention.

We claim as our invention:

1. An assemblage comprising a pair of side-by-side low-resistivity metal soldering electrodes having tips of blade-shaped construction with respective thin workpiece-contactor edges which diverge from one another in a forward direction, which tips, at least in their longitudinal region inclusive of said thin workpiece-contactor edges, are of substantially constant thickness throughout their width.

2. The assemblage of claim 1, further comprising holder means for said electrodes, means to supply current to said electrodes, and means for feeding solder wire to a position adjacent to said tips of said electrodes.

3. A thin-blade soldering electrode tip of metal having a specific resistivity at least as low as that of tungsten, having two thin workpiece-contactor edges which intersect at a forward point located off-center with respect to the width of such tip, and having a substantially uniform thickness throughout its width at least in the longitudinal region inclusive of said thin workpiece-contactor edges.

4. An assemblage comprising two tungsten thin-blade soldering electrode tips disposed side-by-side, so constructed and arranged as to present thin workpiece-contactor edges which diverge from one another in a forward direction, each tip being of substantially uniform thickness throughout its width at least in its longitudinal region including its respective thin workpiece-contactor edge.

5. The assemblage of claim 4, wherein such tungsten thin-blade electrode tips also diverge in a direction perpendicular to their length to form an upwardly-divergent trough-like configuration when properly oriented in space.

6. The assemblage of claim 5, including a tubular member constructed and arranged to direct solder wire into such trough-like configuration.

7. The assemblage of claim 4, wherein such tungsten thin-blade electrode tips are mounted to permit independent variance of their degree of separation as well as their rotary positions relative to each other.

8. A soldering electrode consisting of an elongated straight metal rod having a flat tip of blade-shaped configuration formed in one end thereof, such tip having a workpiece-contactor edge of an average thickness less than one-third the diameter of the rod, having a width substantially equal to the diameter of said rod, and having a substantially uniform thickness throughout its width at least in the longitudinal region inclusive of said thin workpiece-contactor edge.

9. A soldering electrode having an elongated straight rod-shaped part of uniform cross section and having a thin-blade soldering tip of tungsten, such tip having a width substantially equal to the diameter of said rod-shaped portion, having thin contact edges for electrical contact with a workpiece, having an average thickness less than one-third the diameter of said rod-shaped part, and having a substantially uniform thickness throughout its width at least in the longitudinal region inclusive of said thin edges.

10. A soldering electrode having an elongated, straight part and an integral thin-blade soldering tip, such tip having a width substantially equal to the greatest transverse cross-sectional dimension of said straight part, having thin contact edges for electrical contact with a workpiece, having an average thickness less than thirty-thousandths of an inch, and having a substantially uniform thickness throughout its width at least in the longitudinal region inclusive of said thin edges.

References Cited by the Examiner

UNITED STATES PATENTS

| | | | |
|---|---|---|---|
| 2,162,615 | 6/1939 | Harlan | 219—234 |
| 2,429,039 | 10/1947 | Warner | 219—234 X |
| 2,604,571 | 7/1952 | Naulty et al. | 219—234 X |
| 2,623,152 | 12/1952 | Ammon | 219—234 |
| 3,032,637 | 5/1962 | Wasserlein | 219—234 |

RICHARD M. WOOD, *Primary Examiner.*

C. ALBRITTON, *Assistant Examiner.*